United States Patent [19]

Kurahashi et al.

[11] Patent Number: 5,055,946
[45] Date of Patent: Oct. 8, 1991

[54] IMAGE PROCESSING APPARATUS

[75] Inventors: Yoshiyuki Kurahashi; Masanori Yamamoto, both of Osaka, Japan

[73] Assignee: Minolta Camera Kabushiki Kaisha, Osaka, Japan

[21] Appl. No.: 535,178

[22] Filed: Jun. 8, 1990

[30] Foreign Application Priority Data

Jun. 9, 1989 [JP] Japan .................................. 1-147206
Jun. 9, 1989 [JP] Japan .................................. 1-147207
Jan. 12, 1990 [JP] Japan ...................................... 2-4831

[51] Int. Cl.$^5$ .............................................. H04N 1/04
[52] U.S. Cl. .................................................. 358/498
[58] Field of Search ................ 358/498, 496, 442, 444

[56] References Cited

U.S. PATENT DOCUMENTS

| | | | |
|---|---|---|---|
| 4,646,162 | 2/1987 | Sue | 358/498 |
| 4,733,307 | 3/1988 | Watanabe | 358/498 |
| 4,839,740 | 6/1989 | Yoshida | 358/498 |
| 4,910,612 | 3/1990 | Yamazaki | 358/498 |

FOREIGN PATENT DOCUMENTS 63-163376 7/1988 Japan .

Primary Examiner—Stephen Brinich
Attorney, Agent, or Firm—Willian Brinks, Olds, Hofer Gilson & Lione

[57] ABSTRACT

An image processing apparatus comprising a recording member transport path, and an original transport path, a first path connecting the recording member transport path to the original transport path, and a second path connecting the original transport path to the recording member transport path. In the image processing apparatus having this construction, the recording member having an image recorded on a first surface thereof is sent from the recording member transport path into the original transport path through the first connecting path, and is further sent from the original transport path into the recording member transport path through the second connecting path for recording the image on a second surface thereof while being turned upside down by the switchback movement in the original transport path.

24 Claims, 14 Drawing Sheets

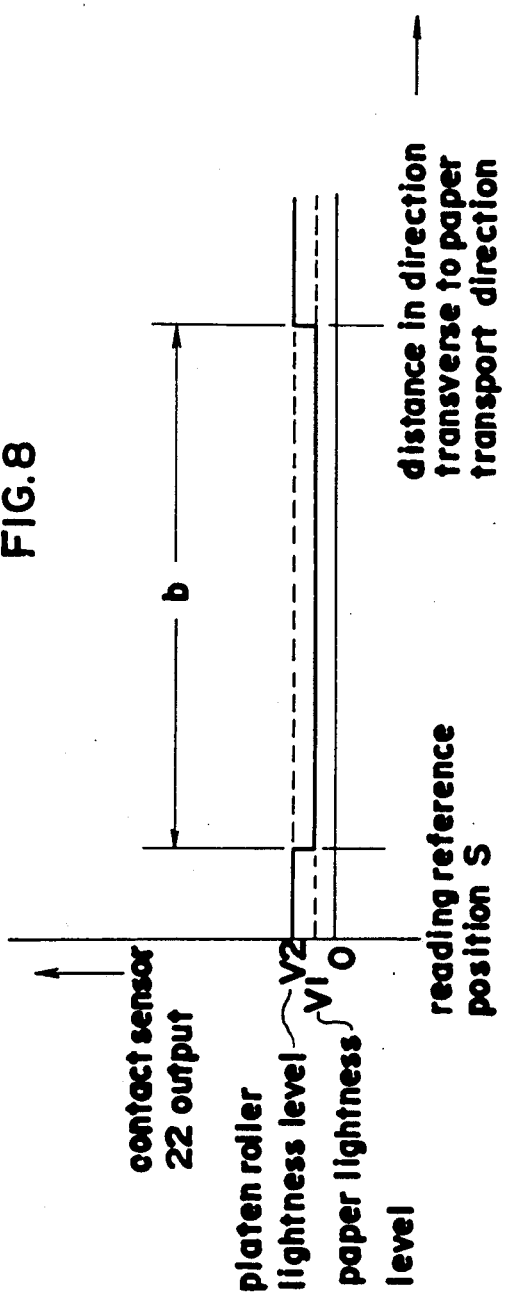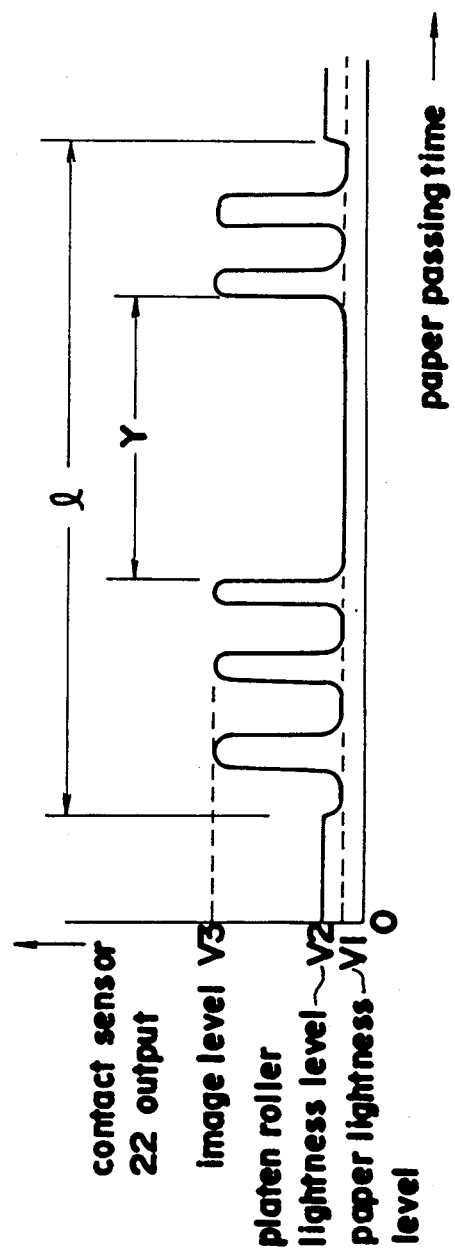

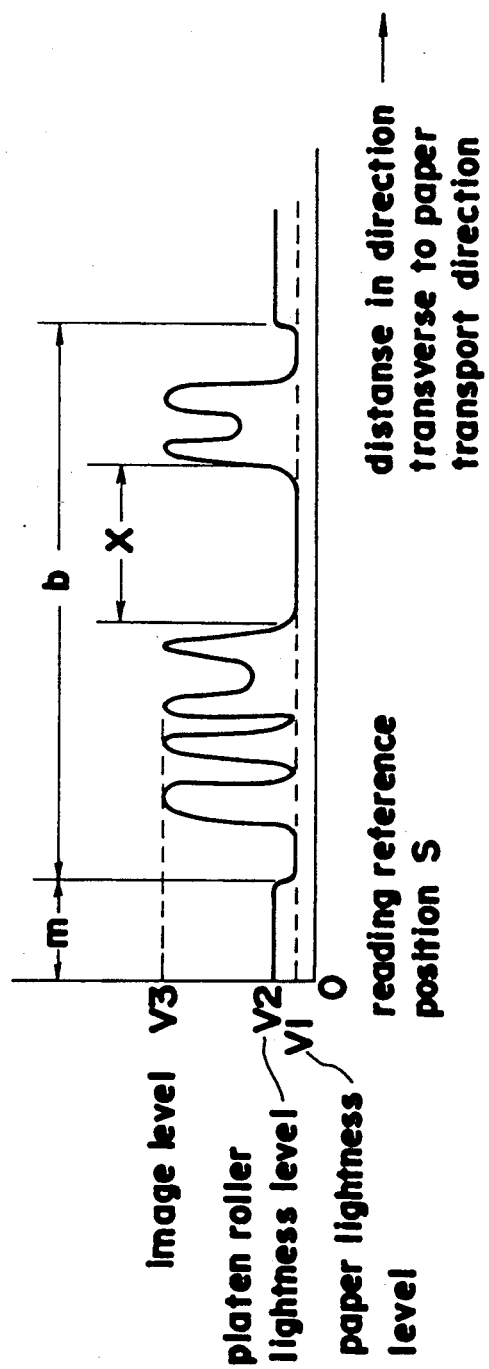

IMAGE PROCESSING APPARATUS

BACKGROUND OF THE INVENTION

1. Field of the Invention

The present invention relates to an image processing apparatus preferably adapted to read images from both surface of documents, produce image data and record images on both surfaces of recording members.

2. Description of the Related Art

Image processing apparatus for producing image data and recording corresponding images on recording members include, for example, facsimile apparatus.

Conventional facsimile apparatus are adapted to receive image data through telephone lines and record the data on only one surface of recording paper.

Such a facsimile apparatus consumes sheets of recording paper equal in number to the number of received pages and therefore requires a correspondingly increased cost. Compact facsimile apparatus wherein the space for accommodating the recording paper is limited must be replenished with paper frequently, hence inconvenience. Further when the apparatus receives a large quantity of data while being left unattended as in nighttime, it is very likely that the apparatus will be unable to receive all the data owing to the absence of recording paper.

A device for refeeding paper for use in copying machines or the like appears useful for overcoming these problems, but the device then makes the apparatus large-sized and more costly.

Further when reading images from documents to transmit the image data through telephone lines, conventional facsimile apparatus read only one surface of each document. However, with copying machines for duplex copying placed into wide use, facsimile apparatus have been developed and are available which are adapted to read both surfaces of the document at the same time.

Nevertheless, although facsimile apparatus must be of a compact and simple construction, the double-face simultaneous reading system requires an image reader for each of the front and rear surfaces, an increased memory capacity for simultaneously processing image data for the two surfaces and a complex mode of control, consequently necessitating an increased cost. Further duplex document reading or duplex recording systems are known for use in copying machines or the like, but these systems are similarly complex and costly. For use in facsimile apparatus, therefore, it has been desired to develop techniques for duplex reading and duplex recording without making the apparatus complex or large-sized.

Further when a double-faced or duplex document is to be transmitted by the conventional facsimile apparatus which is adapted only for single-face reading, the operator must follow the procedure of transmitting one surface, then manually turning the discharged document upside down and thereafter transmitting the other surface. Alternatively, instead of thus repeating transmission, the operator needs to make a copy of one of the two surfaces and transmit the two sheets in succession.

On the other hand, some of the conventional facsimile apparatus not only serve the function of facsimile but are also usable as printers utilizing the recorder and the paper feeder within the apparatus. With any of such facsimile apparatus, the documents to be transmitted are automatically fed one by one from an automatic document feeder to a reader for image reading, while the recording paper for use in receiving data or printing is automatically sent out from a paper cassette set in the apparatus to the recorder to record images thereon. Facsimile apparatus are also known which have a manual paper feeder for the operator to insert recording sheets thereinto one by one manually.

However, compact facsimile apparatus have only one paper cassette, while even a plurality of paper cassettes provided for large-sized apparatus are used for recording paper of specified sizes. It is then likely that the recording paper to be used will be of a size other than the specified size or sizes regardless of whether one cassette or more than one cassette is available.

If the recording paper to be used is of a size other than the specified, sheets of such paper must be manually fed one by one through a manual insertion opening. This gives inconvenience when many prints are to be made.

The problem may be overcome by providing another feeder for acommodating recording paper of free size and automatically feeding the paper one sheet after another, whereas the additional feeder poses the problem of rendering the apparatus complex, large-sized and more costly.

SUMMARY OF THE INVENTION

The main object of the present invention is to provide a compact image processing apparatus of low cost.

Another object of the invention is to provide an image processing apparatus which is adapted to record image data on both surfaces of recording members and to read images from both surfaces of double-faced or duplex documents.

Another object of the invention is to provide an image processing apparatus wherein recording members different in size from those to be supplied from an accommodating portion thereof can be automatically fed in succession.

These objects of the present invention are fulfilled by providing an image processing apparatus comprising:
  first transport means having a first path for transporting recording members,
  recording means disposed at an intermediate portion of the first path for recording an image on the recording member transported,
  second transport means having a second path for transporting documents,
  reading means disposed at an intermediate portion of the second path for reading an image from the document transported,
  third transport means having a third path connecting the first path to the second path for sending into the second path the recording member having an image recorded thereon, and
  fourth transport means having a fourth path connecting the second path to the first path for transporting the recording member as turned upside down from the second path into the first path.

The objects of the present invention are achieved also by providing an image processing apparatus comprising:
  means for holding a sheet,
  reading means for reading an image from the sheet,
  recording means for recording an image on the sheet while the sheet is being transported, first transport means having a first path connecting the holding means to the reading means for transporting the sheet along the first path, second transport means having a second path connecting the first path to the recording means for transporting the sheet along the second path, and change-over means for selectively sending the sheet within the first path into the second path.

The objects of the present invention are attained also by providing an image processing apparatus comprising:

means for holding a document, reading means for reading an image from a document, recording means for recording an image on a recording member while the member is being transported, first transport means having a first path connecting the holding means to the reading means for transporting the document along the first path, second transport means having a second path connecting the first path to the recording means for transporting the document along the second path, and third transport means having a third path connecting the first path to the second path for sending the document from the second path into the first path.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 8 is a graph representing the size of the recording paper as detected transversely of the transport direction;

FIG. 9 is a graph showing image reading output levels along the direction of transport of a document for illustrative purposes;

FIG. 10 is a graph showing image reading output levels transversely of the transport direction for illustrative purposes;

DESCRIPTION OF THE PREFERRED EMBODIMENTS

The facsimile apparatus of a first embodiment of the invention will be described with reference to FIGS. 1 to 10.

Figure 1:
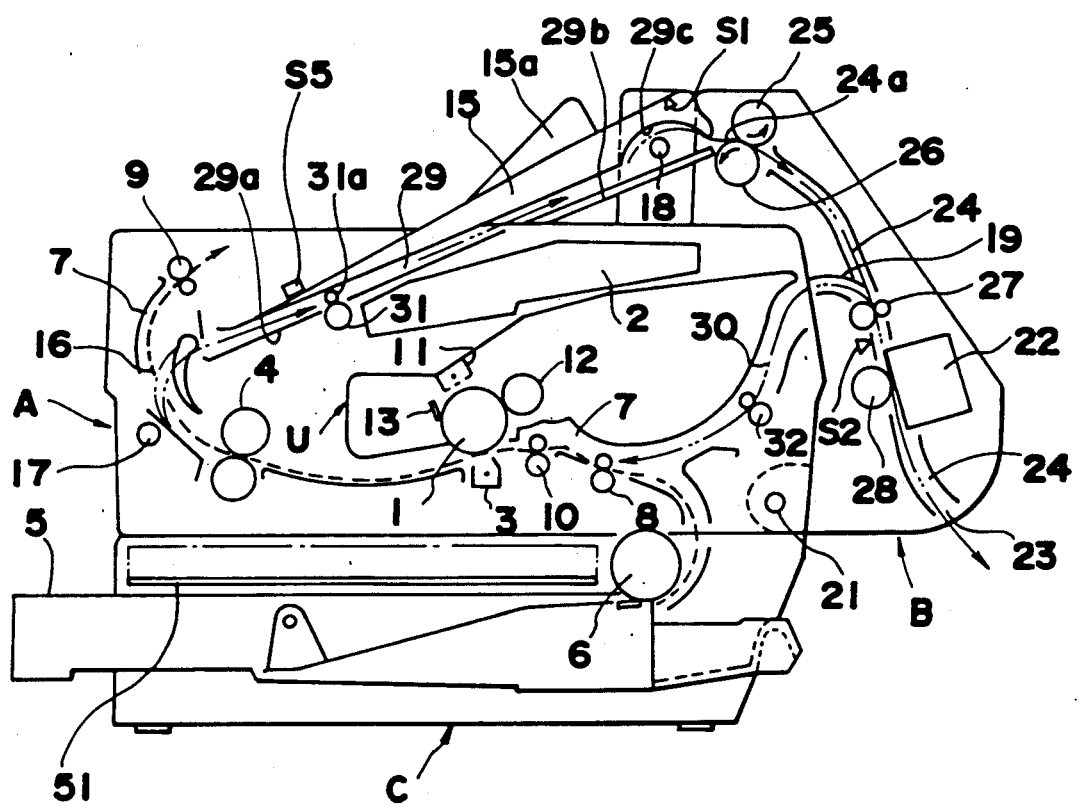
FIG. 1 is a side elevation showing a first embodiment of the invention, i.e., a facsimile apparatus, in use for receiving data.

FIG. 1 is an overall view in section schematically showing the facsimile apparatus as it is used for receiving data, the apparatus being serviceable also as a printer.

As shown in FIG. 1, the apparatus consists generally of three major components, i.e., a recorder A, reader B and paper feeder C.

The recorder A is a printer of the known electrophotographic type comprising a sensitizing charger 11, developing unit 12 and cleaner 13. These components and a photosensitive drum 1 constitute an image forming unit U which is removable and replaceable.

In the recorder A, a printing head 2 projects light on the drum 1 to expose the drum to an optical image and form an electrostatic latent image, which is converted to a visible image by the developing unit 12. A transfer charger 3 then transfers the image onto recording paper fed by the paper feeder C. The paper is thereafter treated by a fixing unit 4 to fix the image to the paper, whereby recording is completed.

The paper feeder C is provided under the recorder A and has a paper cassette 5 containing sheets of recording paper which are sent out one by one into a paper transport channel 7 of the recorder A by a pickup roller 6. The recording paper sent into the channel 7 is passed through the transfer station and the fixing unit 4 and thereafter discharged to a position above the recorder A. The paper transport channel 7 has a transport roller 8, discharge roller 9, and a register roller 10 which is disposed immediately before the transfer station.

While at rest, the register roller 10 properly positions the leading end of the recording paper delivered thereto to preclude the possible skew. The roller 10 is thereafter driven to forward the paper as timed with the image formed on the drum 1 and thereby register the paper with the image at their forward ends.

The reader B is hingedly connected by a hinge pin 21 to one end of the recorder A opposite to the other end thereof where the recording paper is discharged. The reader B has at its lower portion a contact sensor 22 for reading images, and further has a document transport channel 24 through which a document delivered from a multifunction tray 15 disposed above the recorder A is transported to the position of the contact sensor 22 and thereafter discharged from an outlet 23 at the lower end of the channel 24.

The document transport channel 24 has a pair of rollers, i.e. a pickup roller 25 and a reversely rotatable separating roller 26 of the torque limiter type, positioned at a document inlet 24a of the channel and adapted to receive documents from the tray 15 as separated from one another and deliver each document into the channel 24, a reversible transport roller 27 disposed upstream from the contact sensor 22 with respect to the direction of transport of the document, and a reversible platen roller 28.

The multifunction tray 15 has movable side guides 15a and is left open at its rear end and therefore universally usable for placing documents of any size thereon. Accordingly, the tray 15 is serviceable also as a tray for automatically feeding recording paper for printing. In the case where the tray 15 is used for automatically feeding the recording paper, the recording paper placed on the tray 15 is first sent to the position of the contact sensor 22 via the document transport channel 24 like the document. However, the paper is thereafter reversed by the transport roller 27 and the platen roller 28 which are reversely driven, further transported into the paper transport channel 7 of the recorder A via a first connecting channel 30 branching from an intermediate portion of the document transport channel 24, and fed to the transfer station and then to the fixing unit 4 in the same manner as already described. To ensure the reverse advance of the recording paper into the first connecting channel 30, a guide valve 19 comprising a resin film is provided at the junction of the document transport channel 24 and the connecting channel 30.

The paper transport channel 7 also has a second connecting channel 29 branching therefrom at a position downstream from the fixing unit 4 with respect to the direction of transport of the recording paper. The second connecting channel 29 is formed by a guide 29a on the recorder A, the tray 15 and a guide 29b provided on the tray 15. When the tray 15 is brought to a lowered position as shown in FIG. 1 by being moved about a support pivot 18, the second connecting channel 29 connects the paper transport channel 7 to the document inlet 24a of the document transport channel 24. Thus, the recording paper bearing an image recorded on its first surface can be sent into the channel 24 by way of the paper transport channel 7 and the second connecting channel 29. The recording paper bearing the recorded image on the first surface is guided, as turned upside down, into the first connecting channel 30 by being reversed in the document transport channel 24, then returned to the paper transport channel 7 and fed for the subsequent recording on its second surface. In this way, images can be recorded on both surfaces of one sheet of recording paper.

Indicated at 31 is a transport roller for the second connecting channel 29, and at 32 a transport roller for the first connecting channel 30. A driven roller 31a opposed to the transport roller 31 is mounted on the rear side of the tray 15.

Disposed at the terminal end of the second connecting channel 29 is a curved guide portion 29c formed by caving the rear surface of the tray 15 at its base end. The curved guide portion 29c guides the leading end of the recording paper forward through the second transport channel 29, deflecting the paper end slightly downward, whereby the paper leading end is directed toward the document inlet 24a of the channel 24 so as to be nipped between the pair of rollers 25, 26 properly.

Disposed at the junction of the paper transport channel 7 and the second conencting channel 29 is a switch pawl 16, which is shifted by a solenoid, whereby the recording paper delivered from the fixing unit 4 can be guided toward the discharge roller 9 or toward the second channel 29.

When pivotally moved downward to form the second connecting channel 29, the tray 15 can not be used for feeding documents.

To control the foregoing operations, a control board 51 is provided immediately above the portion of the paper feeder C loaded with the paper cassette 5.

Although the paper feeder C is of the single cassette type which receives a drive torque from the recorder A through gear coupling, the feeder can be of the type incorporating a separate motor for use with a plurality of cassettes, can be provided with an increased number of control boards, or can be formed with a hard disk or IC card slot in addition to the control board. Thus, the feeder can be modified variously.

The reader B has incorporated therein a stepping motor M2 specific thereto as its drive source for use in reading images while intermittently feeding documents. The reversible transport roller 27 and platen roller 28 are driven by the stepping motor M2.

The recorder A is of the clampshell type, such that the upper block thereof is upwardly openable as separated by a path of transport of paper formed by the paper transport channel 7 and the second connecting channel 30 in communication therewith.

Figure 2:
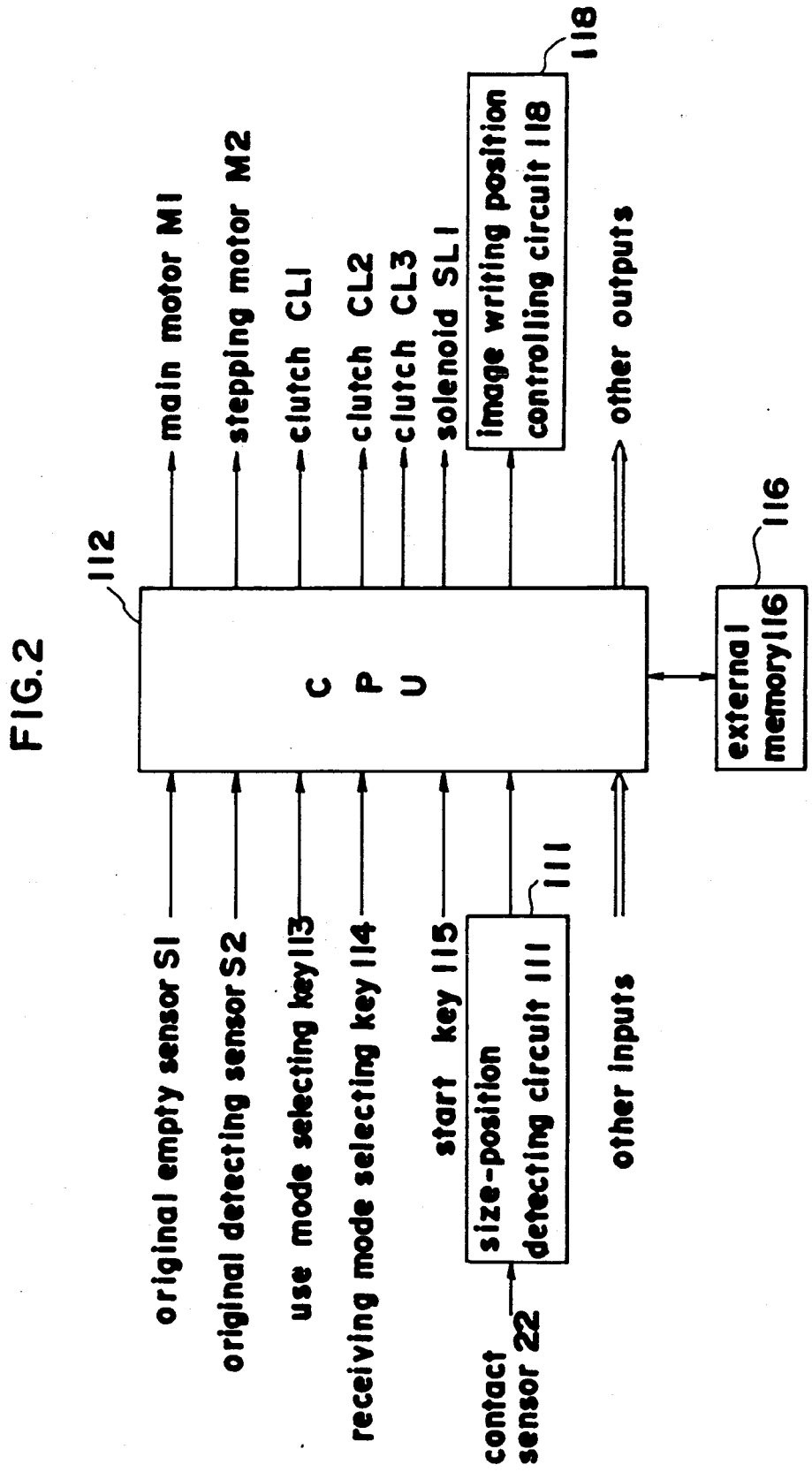
FIG. 2 is a control circuit diagram of the facsimile apparatus.
Figure 3:
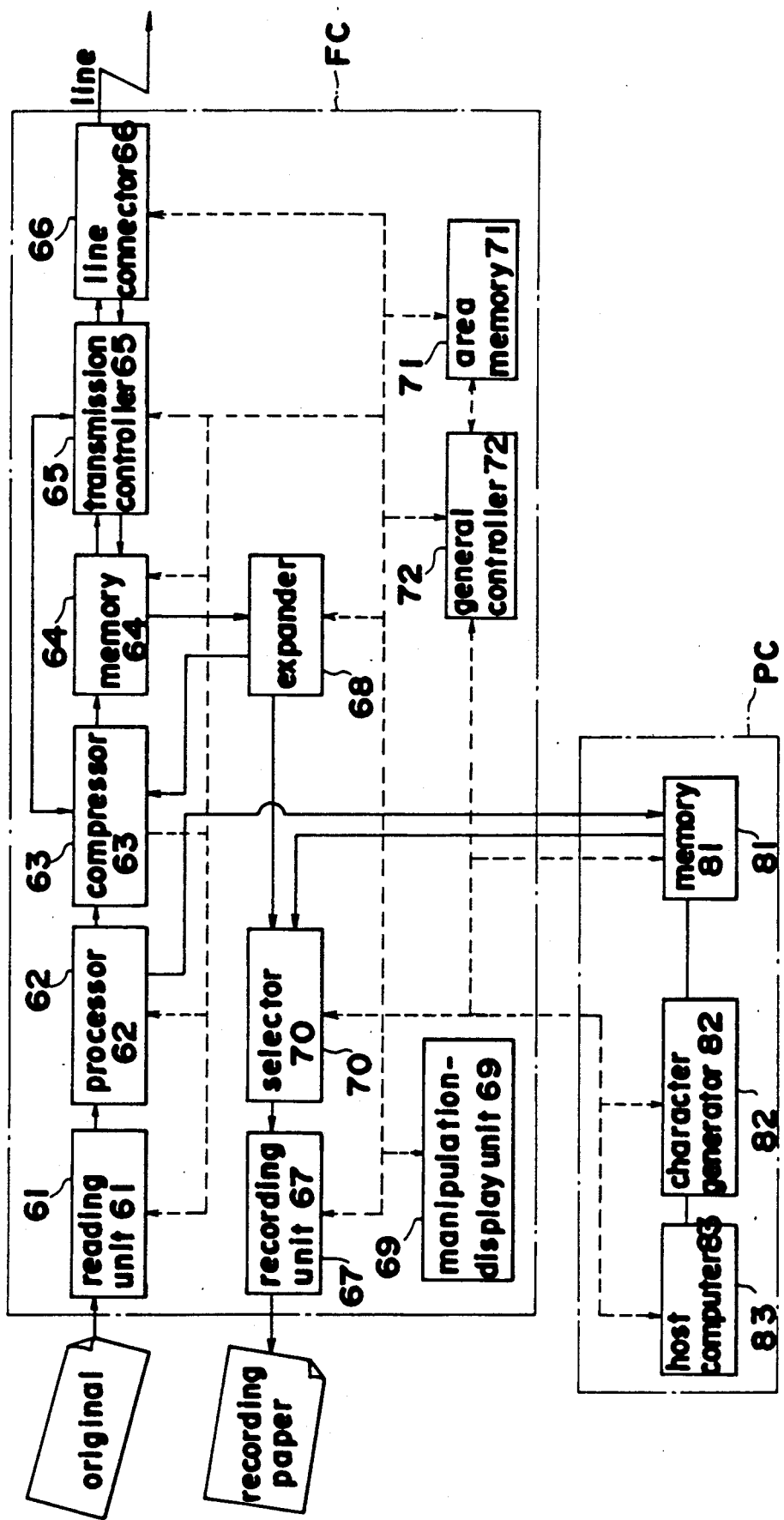
FIG. 3 is a control block diagram in the control circuit diagram of FIG. 2.

The control board 51 has a control circuit comprising a CPU 112 as illustrated in FIG. 2 and provides a control block FC shown in FIG. 3. The CPU 112 receives at its input ports required inputs from a circuit 111 for detecting the size and position of recording paper or the like from reading signals from the contact sensor 22, a sensor S1 for detecting absence of documents on the tray 15, a sensor S2 for detecting documents at a position immediately upstream from the contact sensor 22, a facsimile/printer use mode selecting key 113, a receiving mode selecting key 114 for selecting a double-face receiving mode or single-face receiving mode, start key 115 for transmission or printing, etc. The CPU 112 further delivers operation signals or control signals from its output ports to the components to be controlled according to the above inputs, i.e., to a main motor M1 provided for both the recorder A and the paper feeder C, the stepping motor M2 of the reader B, clutches CL1, CL2 and CL3 of the respective pickup rollers 6, 25 and register roller 10, the solenoid SL1 for shifting the switch pawl 16, a circuit 118 for controlling the image writing position according to the position of recording paper detected by the size-position detecting circuit 111, etc.

With reference to the control block FC of FIG. 3, image data signals are represented by the solid lines shown, and control signals by the broken lines. A reading unit 61 controls the reader B in its entirety including the photoelectric converters and illuminating lamp of the contact sensor 22 and the drive system for the document transport channel 24.

A processor 62 processes data, such that the image signals obtained from the reading unit 61 are subjected to AD conversion, then to gamma conversion and thereafter to conversion to binary data.

A compressor 63 compresses the data received from the processor 62. The compressed data can be transferred to a memory 64 for storage, or forwarded directly to a transmission controller 65.

The memory 64 stores the data from the compressor 63 for data transmission and stores the data from the transmission controller 65 when the apparatus receives data.

For transmission, the transmission controller 65 converts the data from the compressor 63 or memory 64 into facsimile data. The facsimile data received is reversely converted by the controller 65.

The serial digital data delivered from the transmission controller 65 for transmission is converted to analog signals for public lines by a line connector 66, which alternatively reversely converts the signals received from public lines.

A recording unit 67 turns on the laser diodes on the printing head 2 based on the data from an expander 68 and also controls the recorder A, as well as the paper feeder C, in its entirety.

The expander 68 restores compressed data from the memory 64 to the original state by expansion.

A manipulation-display unit 69 controls manipulation and display of keys on the operation panel.

A selector 70 feeds image data signals from the expander 68 to the recording unit 67 when the apparatus is used for facsimile, or signals from a memory 81 to the recording unit 67 when the apparatus is used as a printer.

An area memory 71 stores the data as to the image position of the document from the processor 62 and delivers the data to a general controller 72.

The general controller 72 collectively controls the other components of the block FC, i.e., the reading unit 61 through the area memory 71. When the recorder A of the facsimile apparatus is used as a printer, the general controller 72 is connected to a control block PC comprising the above-mentioned memory 81, a character generator 82 and a host computer 83 to specify the area of blank portion of the document and controls writing in the memory 81.

The memory 81 develops image data from the processor 62 and the character generator 82 for one page while being controlled by the general controller 72 and the host computer 83.

The character generator 82 develops character codes from the host computer 83 into dot image data.

In cooperation with the general controller 72, the host computer 83 inputs the required image data to the document blank area.

While the facsimile apparatus is usable as such as stated above, the apparatus can also be used merely as a printer when the apparatus is changed over by the selector 70.

Since the received image data is stored from page to page in an external memory 116, the image data is so processed as to be output in the order of pages when the apparatus is in the double-face receiving mode. For example, FIG. 6 (a) shows the order of output pages and the orientation of images thereon in the case of an even number of pages, and FIG. 6 (b) shows the order of output pages and the orientation of images thereon in the case of an odd number of pages.

Further when the recording paper having an image recorded on its one surface is to be reversed in the document transport channel 24, the contact sensor 22 is operated to read the difference between the paper and the background thereof, and the reading signal is processed by the circuit 111 to detect the position of the paper with respect to the direction transverse of the channel. Based on the position thus detected, the circuit 118 controls the position where the printing head 2 is to write images. Accordingly, even if the paper bearing the image on one surface deflects toward one side of the channel due to repeated transport, the recording position is adjustable to the deflection. This obviates the need for means for correcting the paper to the normal position widthwise thereof.

The operation of the facsimile apparatus will be described below. First, a description will be given of the single-face receiving mode wherein images are recorded on one surface of the recording paper. The tray 15 is moved to the lowered position shown in FIG. 1. The tray 15 as located in the lowered position is detected by a position sensor S5. When the single-face receiving mode is selected by the receiving mode selecting key 114, with the tray 15 in its lowered position thus detected by the sensor S5, the apparatus operates to receive data in the single-face receiving mode. The signals received are temporarily stored in the memory 64 of the control block FC in FIG. 3, then processed as required and fed as image signals to the printing head 2, which forms an image on the surface of the photosensitive drum 1. In operative relation with this, a sheet of recording paper is sent out from the paper cassette 5 and transported through the paper transport channel 7. The image is transferred to and recorded on the paper by the transfer charger 3. The fixing unit 4 then fixes the image to the paper, which is thereafter guided toward the discharge roller 9 by the switch pawl 16 and delivered onto the tray 15.

When images are to be recorded on both surfaces of recording paper, the double-face receiving mode is selected using the receiving mode selecting key 114 on the operation panel while the tray 15 as located in its lowered position is being detected by the position sensor S5. If the sensor S5 fails to detect the tray 15 so positioned as above despite the selection of the double-face receiving mode, the apparatus does not operate to receive data in this mode. In this mode, an image is transferred onto the first surface of recording paper and fixed thereto in the same manner as described above. However, the paper bearing the fixed image on its first surface is guided toward the second connecting channel 29 by the switch pawl 16 shifted to the phantom-line position in FIG. 1 by the solenoid SL1, and is sent into the document transport channel 24. The paper is subsequently reversed by the reverse rotation of the stepping motor M2 when the paper rear end is detected by the sensor S2 immediately upstream from the contact sensor 22 of the channel 24, and is returned as turned upside down to the paper transport channel 7 via the first connecting channel 30, whereupon another image is transferred onto the second surface of the returned paper. By the time the paper bearing the transferred image on its second surface is passed through the fixing unit 4, the switch pawl 16 is already returned to the original solid-line position shown in FIG. 1 by the solenoid SL1, with the result that the paper having the recorded image on the second surface is delivered onto the tray 15.

Figure 4:
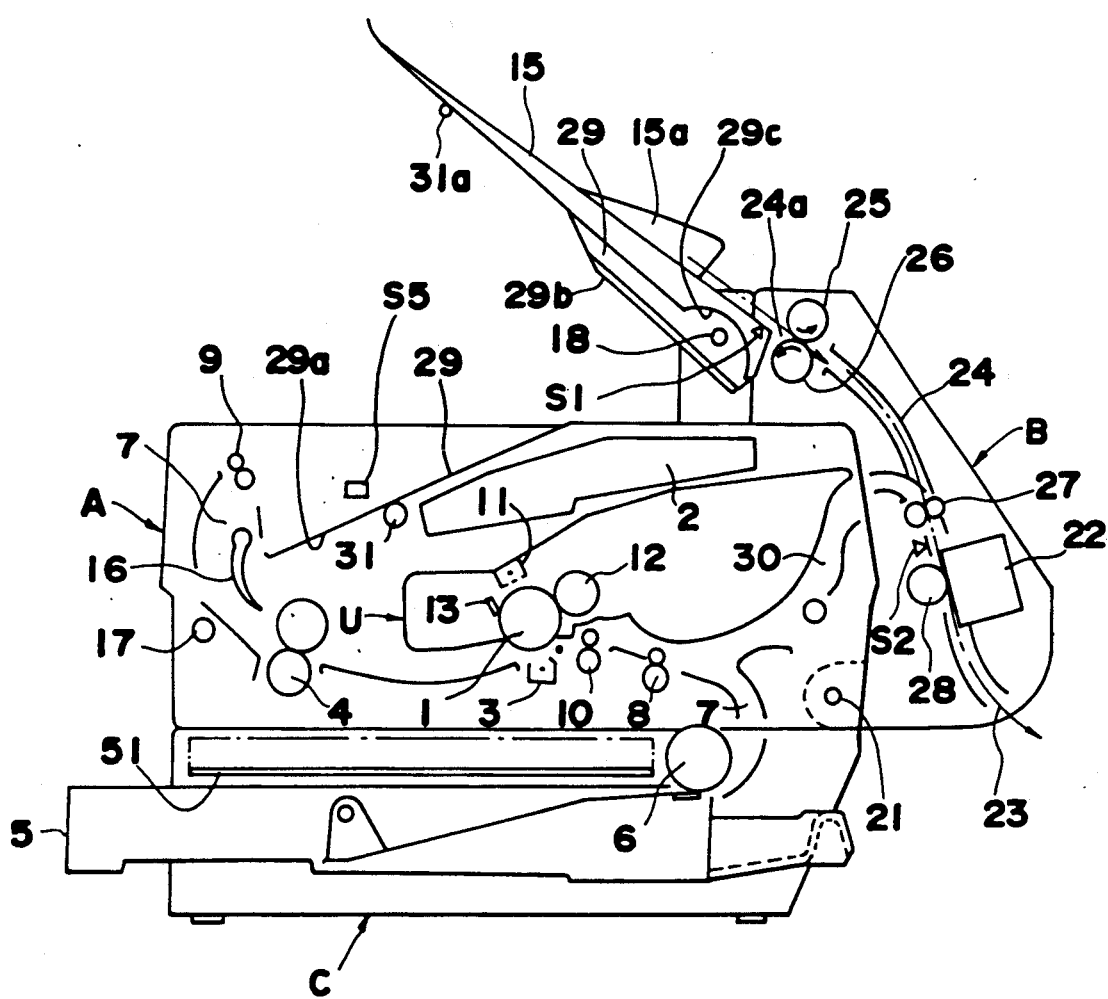
FIG. 4 is a side elevation showing the facsimile apparatus of the first embodiment in use for transmitting data.

When the apparatus is to transmit data, the tray 15 is raised by the operator to a predetermined position as shown in FIG. 4 and locked in this position. This renders the tray 15 serviceable as a portion for stacking documents thereon, positioning and guiding them with the side guides 15a and sending them into the document transport channel 24, thus performing the function of automatically feeding the documents along with the pair of rollers 25, 26.

When the start switch 115 on the operation panel is depressed with documents stacked on the tray 15, the documents are sent into the channel 24 one by one as separated by the pair of rollers 25, 26. When one document reaches the contact sensor 22, image reading is started with timing determined from the detection of leading end of the document by the sensor S2 immediately before the sensor 22. The next document is fed with timing determined from the detection of rear end of the preceding document by the sensor S2.

The document reading operation is completed upon the sensor S1 detecting absence of document on the tray 15.

The image data obtained is temporarily stored in the memory 64 of the control block in FIG. 3, processed into signals as required and then transmitted.

On completion of the transmission, the tray 15 is unlocked from the raised position and moved to the lowered position in preparation for receiving data.

Alternatively when the apparatus is to be used as a printer, the printer use mode is selected by manipulating the use mode selecting key 113.

When the start key 115 is depressed in this mode, image data from the host computer 83 in the control block of FIG. 3 is processed into signals as required and then given to the printing head 2 to form an image on the drum 1. The image is transferred and fixed to recording paper sent forward, whereby a print is obtained in conformity with the image data.

In the case where recording paper of the specified size is to be used for printing, each sheet of paper is fed from the cassette 5 for printing, as timed with an image forming operation. In this case, the paper can be transported in the same manner as already stated to record images on both surfaces of the recording paper.

Figure 5:
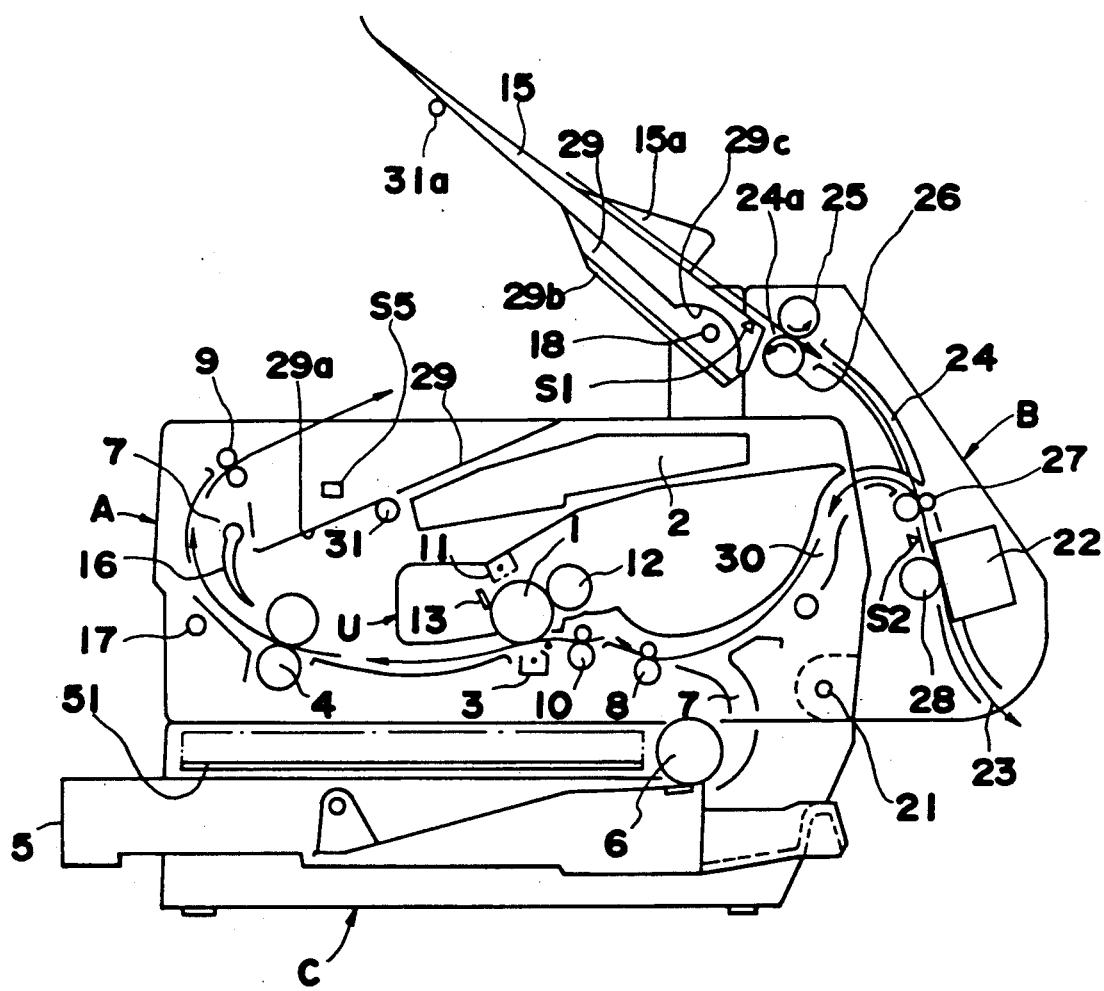
FIG. 5 is a side elevation showing the facsimile apparatus of the first embodiment in use as a printer.
Figure 6:
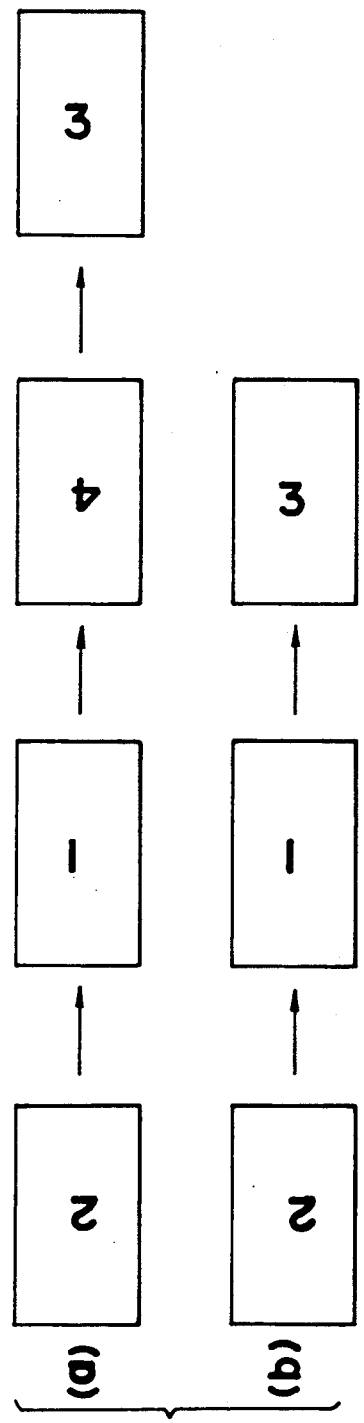
FIG. 6 is a diagram illustrating how printing outputs are delivered to sheets of recording paper when images are to be recorded on both surfaces of the paper.

In the case where recording paper of indefinite size is to be used for printing, the tray 15 is moved to the raised position shown in FIG. 5, and the paper is placed thereon. With the printer use mode selected and also with the sensor S1 detecting the recording paper on the tray 15 at this time, the feed of paper from the cassette 5 is discontinued and changed over to the feed of paper from the tray 15.

When a request is made for feeding paper for an image forming operation, the transport system of the reader B is driven to send a sheet of paper from the tray 15 into the document transport channel 24. Upon the sensor S2 detecting the rear end of the paper, the reversible platen roller 27 and transport roller 28 are driven reversely, reversely transporting the paper into the first connecting channel 30 and then into the paper transport channel 7. An image is transferred and fixed to the paper for printing.

Figure 7:
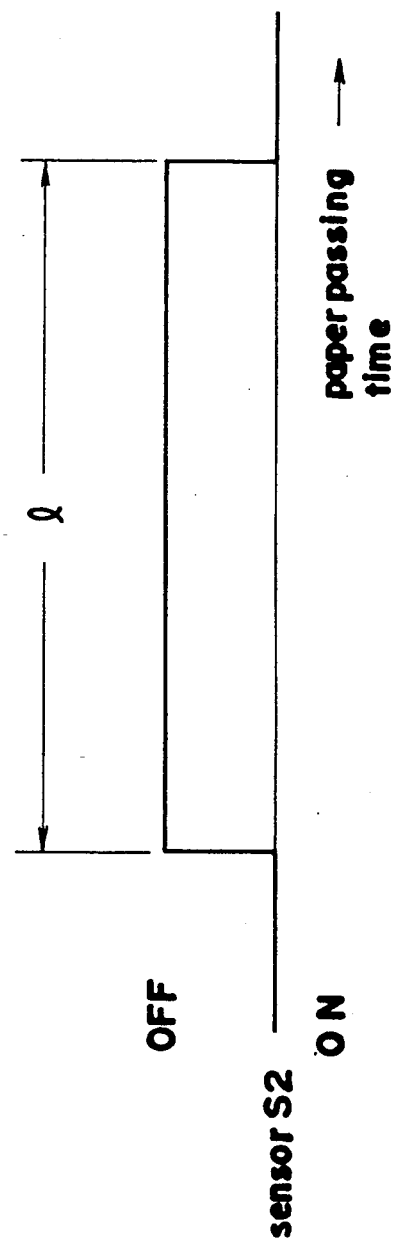
FIG. 7 is a graph representing the size of recording paper as detected in the direction of transport of the paper.

The time taken for the paper sent out from the tray 15 to move past the sensor S2 is measured, whereby the size l of the paper in the direction of transport thereof is detected (see FIG. 7). Further the contact sensor 22 is caused to function for a period of time while the recording paper is moving past the sensor to read the difference in lightness between the paper and the background thereof (e.g., the platen roller 28 which is gray) and calculate the distance between the portions where the lightness differs, whereby the size b of the paper transverse to the transport direction is detected (see FIG. 8).

The position where the recording paper moves past is also detectable by calculating the distance m from the reading reference position S for detecting the transverse side b of the paper to the position of difference in lightness between the paper and the background thereof (see FIG. 10).

Accordingly, sheets of recording paper of indefinite size can also be fed automatically from the tray 15 in succession, while the image to be recorded can be properly positioned on recording paper of any indefinite size which is automatically fed.

Furthermore, the tray 15 is usable for feeding image-bearing documents for additional printing. In this case, the image of the document is read when the document sent into the document transport channel 24 moves past the contact sensor 22. This makes it possible to calculate a region Y bearing no image along the direction of transport (see FIG. 9) and a region X bearing no image transverse to the transport direction (see FIG. 10). When the document is further transported for printing via the first connecting channel 30 after reversing, the printing operation is controlled by the control block of FIG. 3 so as to record an image only in the area (X, Y) bearing no image.

Figure 11:
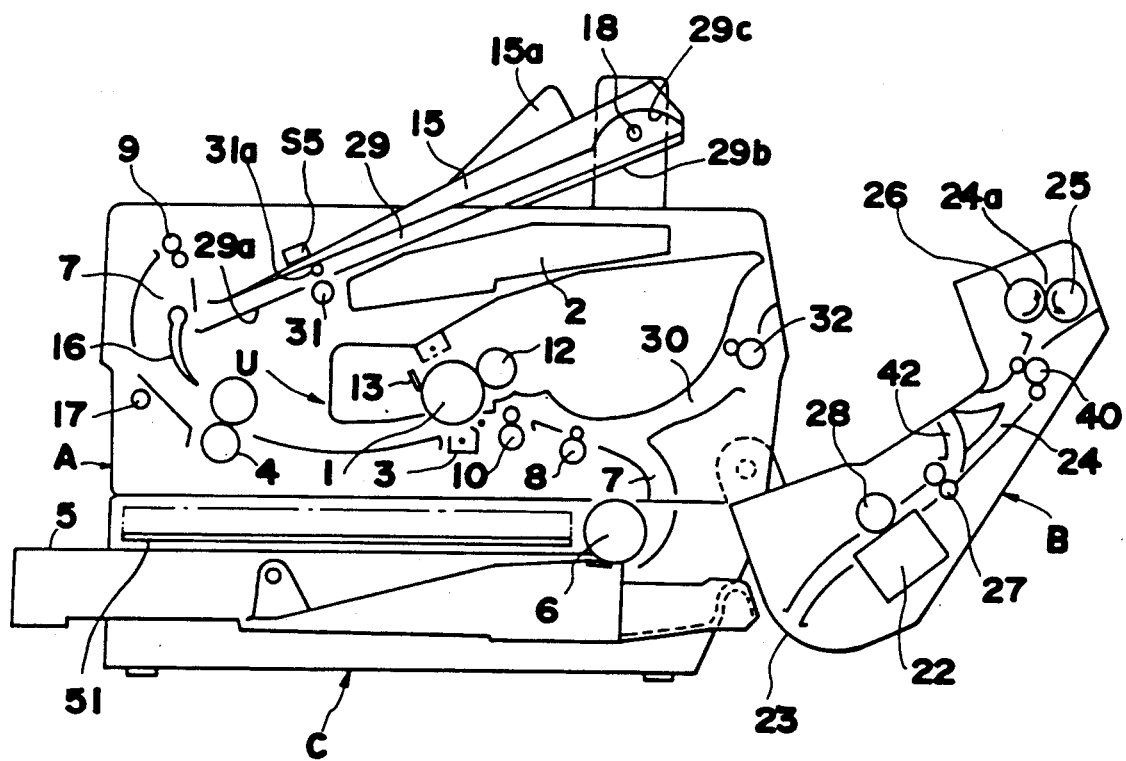
FIG. 11 is a diagram illustrating how to treat a jam in the facsimile apparatus.

This mode of printing can be applied, for example, to recording on paper having a letterhead, by feeding the paper from the tray 15 to print an image on the paper portion other than the letterhead, and feeding recording paper from the cassette 5 for the printing of the subsequent pages over the entire area of the paper. In the event of a jam, the jam can be treated with greater ease by opening the reader B about the hinge pin 21 as seen in FIG. 11 and then opening the upper block of the recorder A about the support pivot 17.

Figure 12:
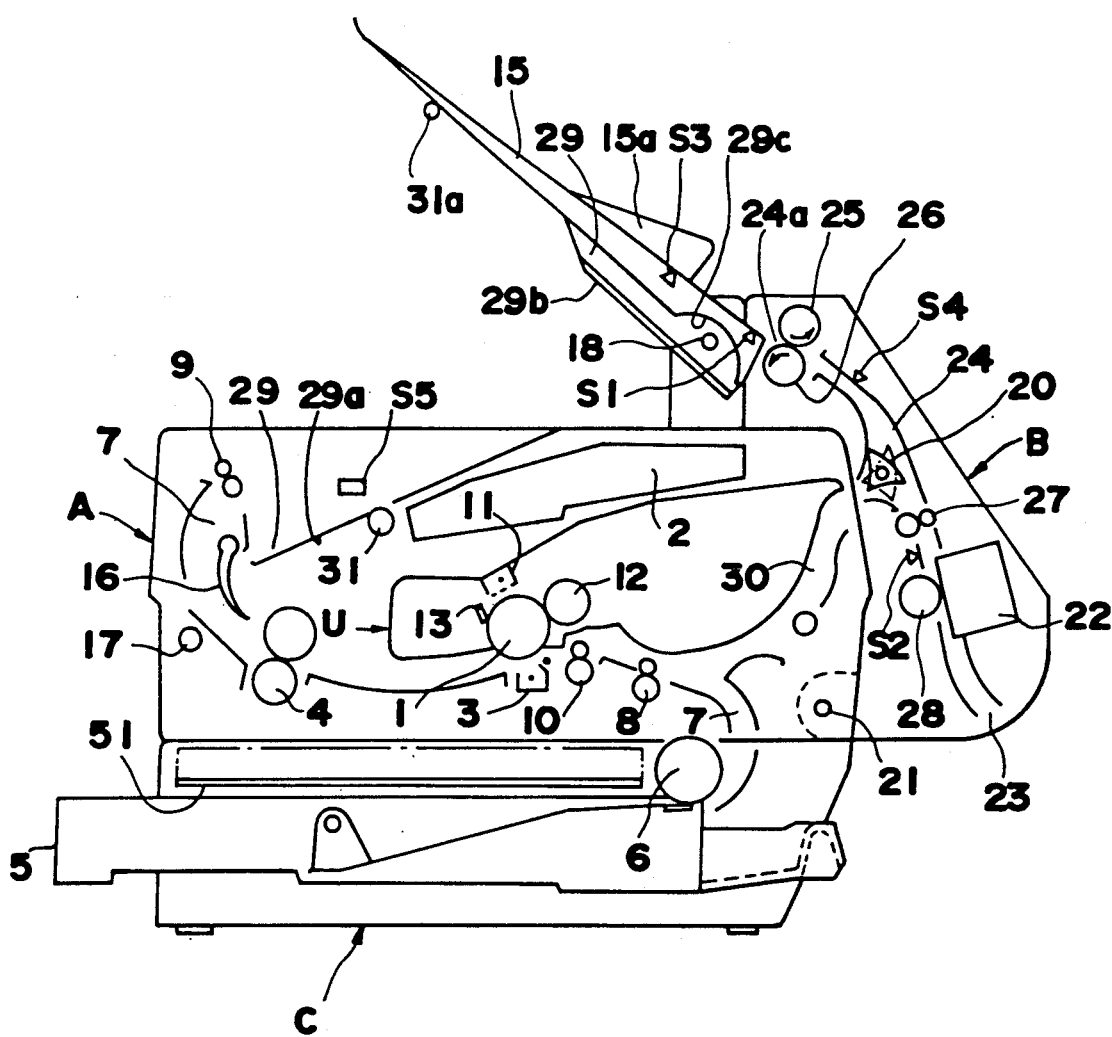
FIG. 12 is a side elevation schematically showing the construction of another facsimile apparatus as a second embodiment of the invention.

FIG. 12 shows a second embodiment of the present invention, which differs from the first embodiment in that the intermediate portion of the document transport channel 24 from which the first connecting channel 30 branches is provided with a switch pawl 20 for changing over the path of transport.

The switch pawl 20, when in the solid-line position shown, guides the document or recording paper sent into the channel 24 to the contact sensor 22 and further guides the document or paper toward the first connecting channel 30 when it is reversed. In this case, therefore, the apparatus operates in the same manner as the first embodiment.

The switch pawl 20, when in the phantom-line position shown, guides the document or recording paper transported into the document transport channel 24 directly into the first connecting channel 30 from the upstream side of the reversible transport roller 27 with respect to the direction of transport.

Consequently, the recording paper supplied from the tray 15 can be fed directly for printing without being reversed after having been transported to the position of the contact sensor 22.

Moreover, the recording paper once printed can be printed again on the same surface without being reversely transported, whereby a composite print can be obtained.

Incidentally, if the reversing at the position of the contact sensor 22 is omitted, the size of the recording paper supplied from the tray 15 can not be detected. The second embodiment is therefore provided with a sensor S3 for detecting the size of recording paper transverse to the transport direction according to the position of the side guide 15a on the tray 15, and a sensor S4 for detecting the size of the paper in the direction of transport at a position on the channel 24 before the paper reaches the first connecting channel 30.

Next, another facsimile apparatus as a third embodiment of the invention will be described with reference to FIG. 13. The third embodiment greatly differs from the first embodiment in that it has a guide plate 39 movable with the movement of the multifunction tray 15 to its raised position, an inversion roller 40 having two driven rollers 40a, 40b and disposed between the pickup roller 25 and the reversible transport roller 27, and a transmission mode selecting key 117 provided on the operation panel, and further in that the first connecting channel 30 is branched in the reader B into a switchback connecting channel 42 and an inversion connecting channel 44.

The facsimile apparatus of the third embodiment thus constructed is adapted to receive data for recording images on both surfaces of recording paper and to supply recording paper from the tray 15 for use as a printer as already described, and is further adapted for the transmission of double-faced documents bearing images on both surfaces.

Figure 13:
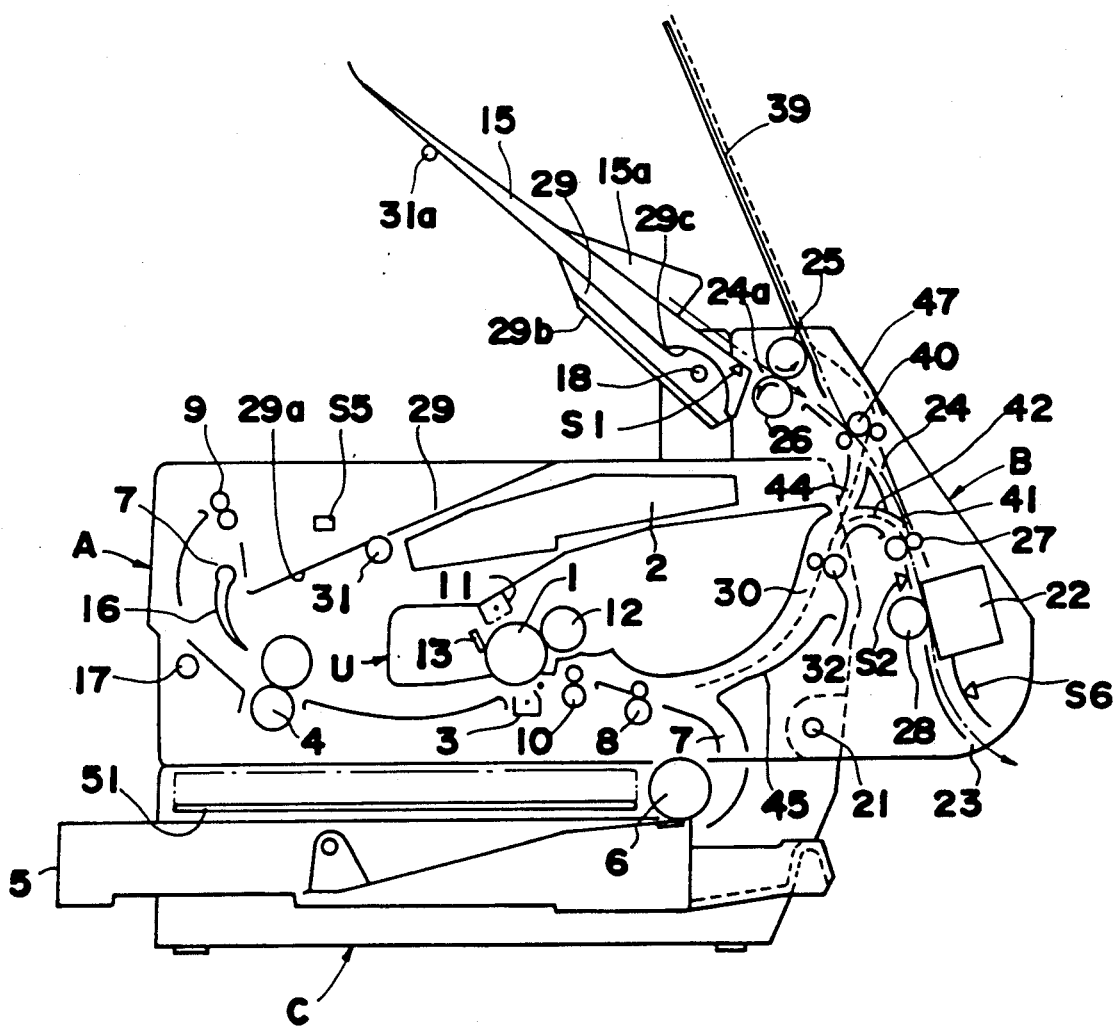
FIG. 13 is a side elevation showing another facsimile apparatus as a third embodiment of the invention as it is used for transmitting data.
Figure 14:
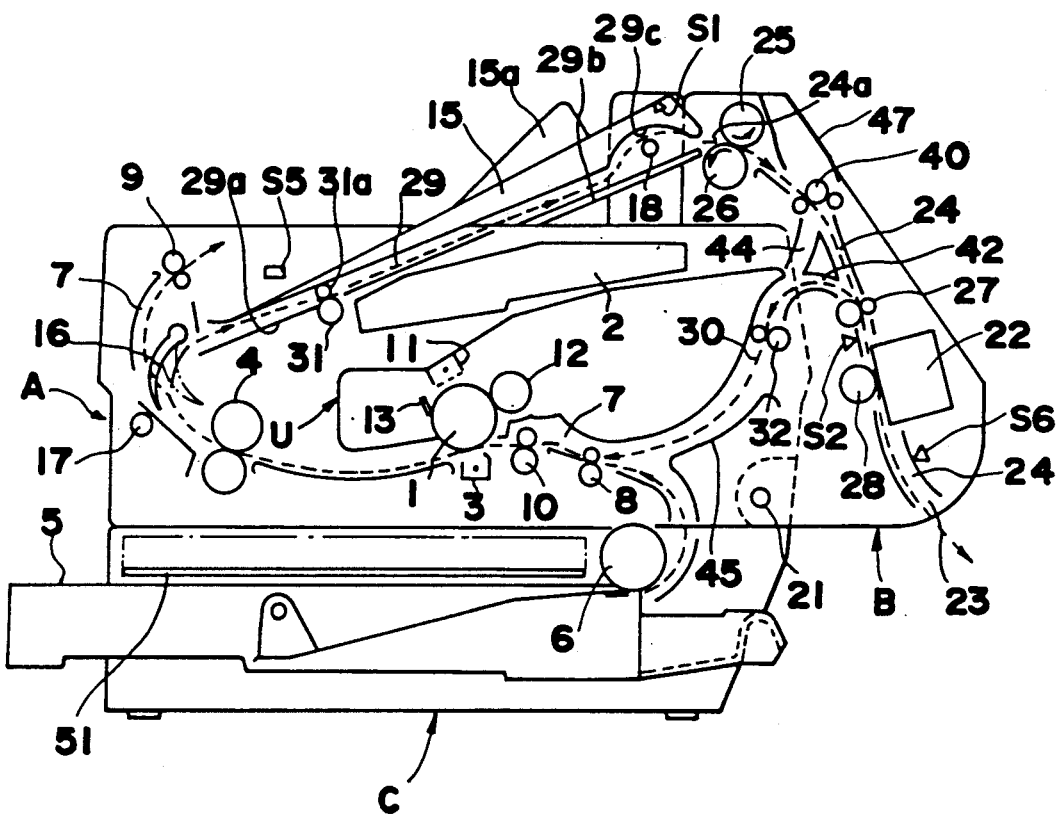
FIG. 14 is a side elevation showing the facsimile apparatus of the third embodiment in use for receiving data.

The path of transport of the recording paper in the double-face receiving mode and the path of transport of the recording paper to be supplied from the tray 15 in the third embodiment are indicated in broken lines in FIG. 14, and the transport operation along these paths is the same as in the first embodiment and therefore will not be described again. However, when the recording paper is supplied from the tray 15 and transported along the path indicated in the broken line in FIG. 14, the tray 15 is in the position shown in FIG. 13.

The operation of the facsimile apparatus to transmit double-faced documents will be described with reference to FIG. 13 and FIG. 15 which shows the reader B on an enlarged scale.

As seen in FIG. 13, the multifunction tray 15, when raised, also raises the guide plate 39 therewith. The plate 39 is locked in the illustrated position and thereby made ready for transmitting the documents. In this state, the start key 115 on the operation panel is depressed, whereby the documents as stacked on the tray 15 are sent into the document transport channel 24 through the inlet 24a by the pair of pickup roller 25 and reversely rotatable separating roller 26 of the torque limiter type for transporting documents one by one as separated into the channel 24. Subsequently, the document is passed between the inversion roller 40 and one of the driven rollers, 40a, further sent through the channel 24 and brought to the position of the contact sensor 22 by the reversible transport roller 27. (See FIG. 15.) Between the roller 27 and the contact sensor 22, there is the sensor S2, which detects the leading end of the document, whereupon the contact sensor 22 starts to read the image on the document.

After the completion of reading, i.e., a period of time t1 after the detection of the document rear end by the sensor S2, the roller 27 and the platen roller 28 are reversely driven, whereby the document having its first face read is reversely transported. The document is then guided into the switchback connecting channel 42 by a Mylar valve 41 provided in the channel 24, led into the first connecting channel 30 and further transported into the paper transport channel 7 by the transport roller 32 on the channel 30. When the length of the document is larger than the distance between the roller 32 and the transport roller 8, the document moves out of a guide frame 45 forming the first connecting channel 30 through a cutout 46 provided in the guide frame 45 as seen in FIG. 15 and forms a suitable loop.

A period of time t2 after the detection of the document rear end by the sensor S2, the transport roller 32 starts to rotate forward, sending the document from the channel 30 into the inversion connecting channel 44 which is a bypass joined to the channel 24. The document moves across the channel 24, passes between the inversion roller 40 and the driven roller 40b, is discharged to the outside once and led along a guide 47 to the guide plate 39. During this reverse travel, the document will not enter the switchback connecting channel 42 again since a one-way Mylar valve 43 is provided at the outlet of the channel 42.

The rear end of the document temporarily delivered to the guide plate 39 is led by the guide plate 39 to the nip of the inversion roller 40 and the driven roller 40a and sent into the channel 24 again. The document is transported through the channel 24 to the position of the contact sensor 22, which reads the second surface of the document as when reading the first surface. When a document discharge sensor S6 (see FIG. 15) detects the rear end of the document after the second surface has been read, the pickup roller 25 and the separating roller 26 which have been at rest are driven to send out the next document.

Single-faced documents, when to be transmitted, are placed on the tray 15 without using the guide plate 39, and the start key 115 on the operation panel is depressed, whereupon the document as separated off by the pair of rollers 25, 26 is sent into the channel 24. The sensor S2 detects the leading end of the document, whereupon the contact sensor 22 starts reading the image. The next document is fed when the sensor S2 detects the rear end of the preceding document.

The control system operates in the manner to be described below when transmitting double-faced documents. When double-faced documents are to be transmitted, the tray 15 and the guide plate 39 are raised as shown in FIG. 13 and locked in position. In this state, the double-face transmission mode is selected using the transmission mode selecting key 117, whereby the apparatus is made ready for the transmission of double-faced documents. Upon depression of the start key 115, the double-faced document is sent into the document transport channel 24 from the tray 15 and fed for reading. One surface of the document is read in the same manner as in the single-face transmission already described. After a signal resulting from the detection of the document rear end by the sensor S2 is fed to the control circuit, control for double-face reading is initiated.

The control for double-face reading is accomplished by setting the timing of positive or reverse rotation of the document transport rollers as listed below.

Figure 15:
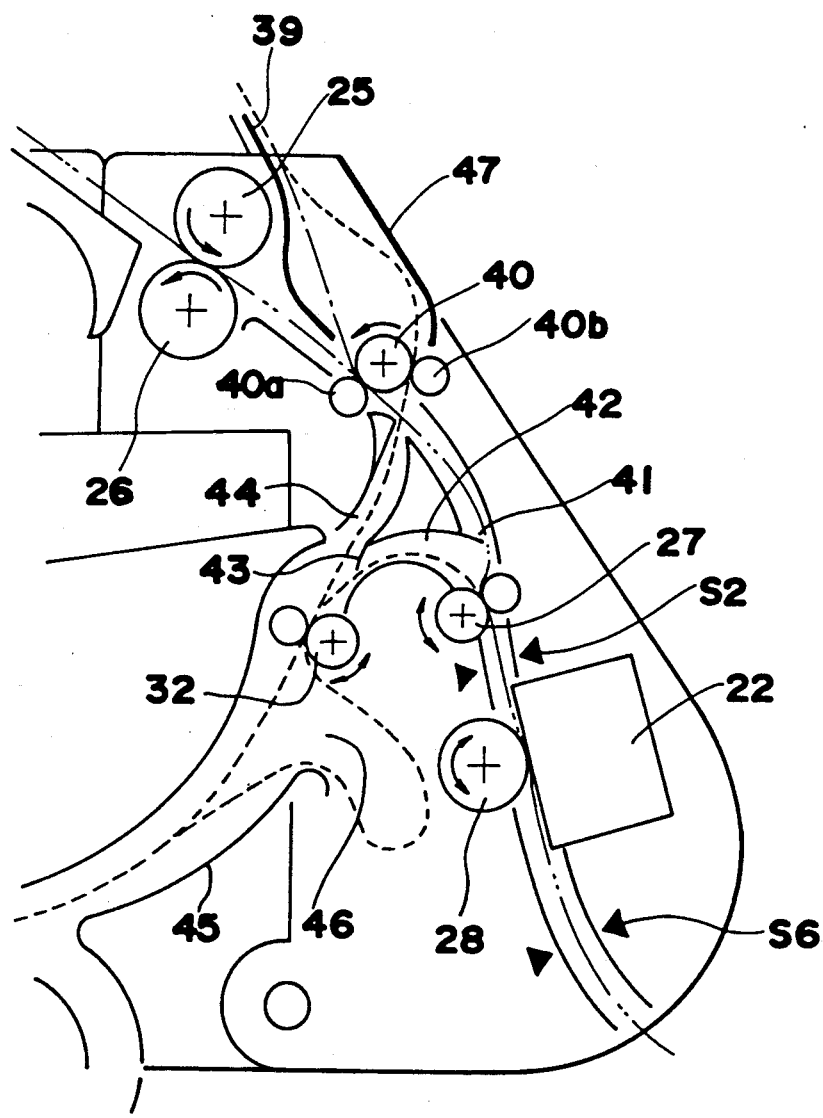
FIG. 15 is an enlarged side elevation showing the reader of the facsimile apparatus of the third embodiment.

The terms "positive" and "negative" directions of rotation refer respectively to the clockwise and counterclockwise directions as the apparatus is viewed from the same direction as shown in FIG. 15.

| Roller | Timing |
| --- | --- |
| | First surface reading → After t1 → After t2 |
| Inversion roller 40 | Reverse → Positive → Reverse |
| Transport roller 27 | Positive → Reverse → Positive |
| Platen roller 28 | Positive → Reverse → Positive |
| Transport roller 32 | Positive → Reverse → Positive |

Since the rollers are coupled by gears and driven by the stepping motor M2 serving as a drive source, the reverse transport can be accomplished readily by changing the direction of rotation of the motor M2.

The rollers are rotated in the positive or reverse direction as above to excecute the control for double-face reading which is initiated upon the sensor S2 detecting the rear end of the document after the reading of the first surface.

Figure 16:
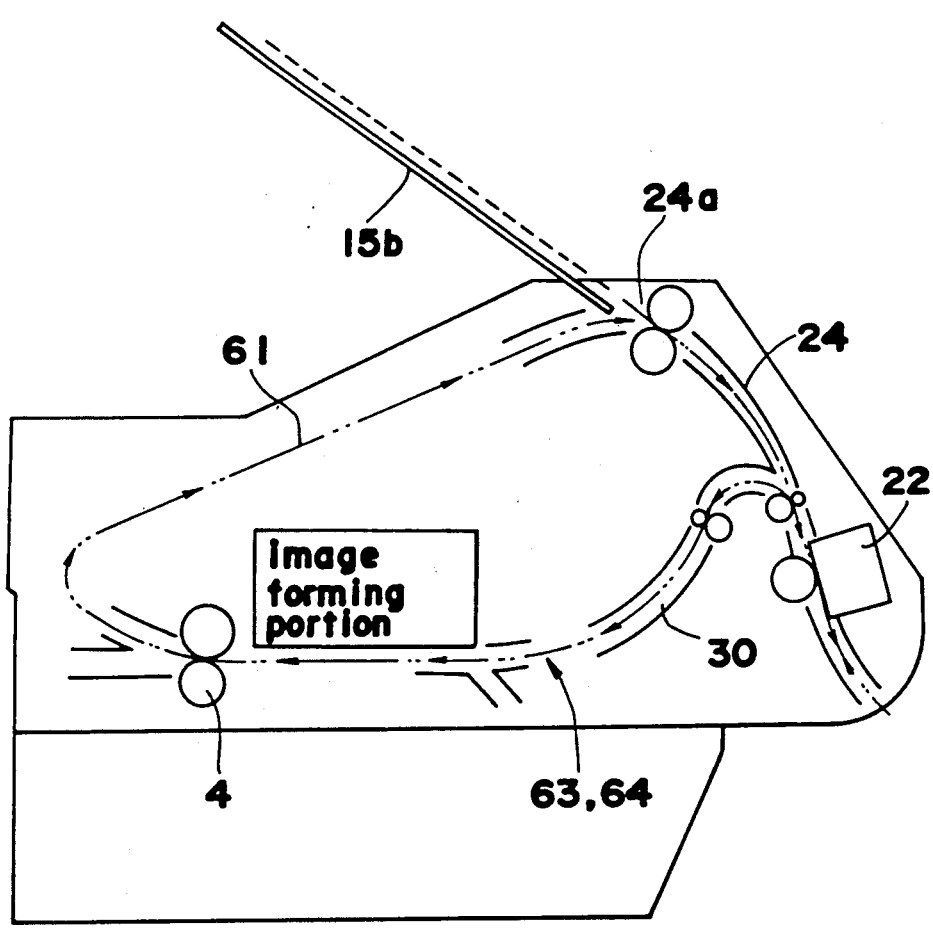
FIG. 16 is a side elevation schematically showing the construction of another facsimile apparatus as a fourth embodiment of the invention.

FIG. 16 shows a fourth embodiment of the present invention, in which a third connecting channel 61 connected to the document transport channel 24 is formed independently of the document tray 15, whereby the recording paper used for recording on the first surface is led to the image reading position of the channel 24 independently of the tray 15. The paper is then reversed at this position, thereafter transported through a recording paper retransport channel 64 and fed for recording on the second surface. Furthermore, the retransport channel 64 serves also as a document refeed channel 63 through which the document fed for reading the first surface is fed again for the reading of the second surface.

With this facsimile apparatus, the document sent to the reading position from the document tray 15 and having its first surface read is reversely transported, turned upside down, placed into the refeed channel used for double-face recording, moved past the image forming portion at rest, led to the document inlet 24a via the same path as for double recording and sent through the channel 24 to the position of the contact sensor 22, where the second surface is read.

The fourth embodiment therefore simplifies the travel of the document for the reading of the second surface, while the refeed channel 63 of increased length is advantageous to the reading of the second surface when the document has a large length.

When the facsimile apparatus of the above construction is used as a printer, it is also possible to record images on both surfaces of recording paper supplied from the tray 15.

Although the foregoing embodiments of the invention are facsimile apparatus only, the present invention can be embodied as digital copying machines wherein image data read is output and recorded on recording members, as apparatus wherein read image data is output, magnetically or optically processed and thereafter recorded on recording members, and as image processing apparatus of any type.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A facsimile apparatus comprising:
   first transport means having a first path for transporting a recording paper;
   recording means disposed at an intermediate portion of the first path for recording an image on the recording paper transported;
   second transport means having a second path for transporting an original;
   reading means disposed at an intermediate portion of the second path for reading an image from the original transported;
   transmitting means for transmitting an original image information output by the reading means through a telephone network;
   third transport means having a third path connecting the first path to the second path for sending into the second path the recording paper having an image recorded thereon; and
   fourth transport means having a fourth path connecting the second path to the first path for transporting the recording paper as turned upside down from the second path to the first path.

2. A facsimile apparatus as claimed in claim 1 further comprising:
   discharge means for discharging the recording paper out of the apparatus; and
   change-over means disposed at the junction of the first path and the third path for selectively sending the recording paper transported in the first path toward the discharge means or toward the third path.

3. A facsimile apparatus as claimed in claim 2 wherein the third transport means has an original tray movable from a first position to a second position, said original tray guiding into the second path the original in the first position and forming the third path in the second position.

4. A facsimile apparatus as claimed in claim 3 wherein the original tray having an original placing surface and a recording paper guiding surface, the original tray holding the original on the original placing surface in the first position and forming the third path by means of the recording paper guiding surface in the second position.

5. A facsimile apparatus as claimed in claim 4 wherein the discharge means discharges the recording paper onto the original placing surface of the original tray when the original tray is in the second position.

6. A facsimile apparatus as claimed in claim 1 wherein the reading means has a reversible platen roller and a reader, the platen roller rotating forward upon reading the image on the original, the second path being connected to the fourth path at the upstream side of the platen roller with respect to an original transport direction in the second path, and the recording paper transported from the first path through the third path into the second path being sent into the fourth path after the switchback movement by the platen roller.

7. In an image processing apparatus having a reading portion wherein an image of an original is read and a recording portion wherein an image is recorded on a recording paper, a method comprising the steps of:
   recording a first surface of the recording paper while transporting the recording paper in a recording paper transport channel;
   sending into an original transport channel the recording paper having the image recorded on the first surface thereof;
   sending the recording paper having the image recorded on the first surface thereof through the original transport channel into the recording paper transport channel while turning the recording paper upside down; and
   recording the image on a second surface of the recording paper turned upside down and transported in the recording paper transport channel.

8. A method as claimed in claim 7 further comprising the steps of:
checking whether holding means is in a second position, said holding means holding the original in a first position and forming a first connecting channel for transporting the recording paper having the image recorded on the first surface thereof from the recording paper transport channel into the original transport channel in the second position;
selecting a second mode from first and second modes, the recording paper being recorded on the first surface thereof in the first mode and being recorded on first and second surfaces in the second mode; and
prohibiting the selection of the second mode when the holding means is not in the second position.

9. A facsimile apparatus comprising:
holding means for holding a sheet;
reading means for reading an image from the sheet;
transmitting means for transmitting an image information output by the reading means through a telephone network;
recording means for recording an image on the sheet;
first transport means having a first path connecting the holding means to the reading means for transporting the sheet along the first path;
second transport means having a second path connecting the first path to the recording means for transporting the sheet along the second path; and
change-over means for selectively sending the sheet within the first path into the second path.

10. A facsimile apparatus as claimed in claim 9 wherein the change-over means has a reversible roller disposed in the first path, said roller sending the sheet into the second path in the reverse rotation.

11. A facsimile apparatus as claimed in claim 10 wherein the reading means includes a reader confronting the roller.

12. A facsimile apparatus as claimed in claim 9 further comprising:
a supplying portion having an accommodating portion for accommodating the sheets therein and supplying means for supplying into the second path the sheets accommodated in the accommodating portion.

13. A facsimile apparatus as claimed in claim 9 wherein the holding means has a placing surface on which the sheet is held and a regulating member disposed on the placing surface so as to move in a direction perpendicular to a sheet transport direction by the first transport means for regulating a width of the sheet.

14. A facsimile apparatus as claimed in claim 13 further comprising:
detecting means for detecting that the sheet is placed on the placing surface of the holding means;
selecting means for selecting either of a first use mode and a second use mode, the transmitting means is in operation in the first use mode and the transmitting means is out of operation in the second use mode; and
control means for controlling the sheet supply from the supplying portion so as to be prohibited according to the detection by the detecting means and the selection of the second use mode by the selecting means.

15. An image processing apparatus comprising:
holding means for holding a sheet;
reading means for reading an image from the sheet and outputting an image information;
recording means for recording an image on the sheet;
first transport means having a first path connecting the holding means to the reading means for transporting the sheet along the first path;
second transport means having a second path connecting the first path to the recording means for transporting the sheet along the second path; and
control means for controlling the recording means according to the information output by the reading means.

16. An image processing apparatus as claimed in claim 15 further comprising:
change-over means for selectively sending the sheet within the first path into the second path.

17. An image processing apparatus as claimed in claim 15 wherein the control means controls the recording means so as to record the image on the proper portion of the sheet according to the information output by the reading means.

18. In an image processing apparatus which comprises holding means having a placing portion wherein a plurality of originals are stacked, reading means for reading an image from the original transported from the holding means into an original transport channel, and recording means for recording an image on a recording paper transported in a recording paper transport channel, a method comprising the steps of:
placing the recording paper on the placing portion of the holding means;
sending the recording paper into the original transport channel; and
sending the recording paper into the recording paper transport channel through the original transport channel.

19. A facsimile apparatus comprising:
holding means for holding an original;
first transport means having a first path for transporting the original guided from the holding means into the first path;
reading means disposed at an intermediate portion of the first path for reading an image from the original transported;
transmitting means for transmitting an image information output by the reading means through a telephone network;
second transport means having a second path for transporting a recording paper;
recording means disposed at an intermediate portion of the second path for recording an image on the recording paper transported;
third transport means having a third path connecting the first path to the second path for sending into the second path the original following reading the image from the original; and
fourth transport means having a fourth path connecting the third path to the first path for sending the original as turned upside down from the third path into the first path.

20. A facsimile apparatus as claimed in claim 19 wherein the reading means has a reversible platen roller and a reader, the platen roller rotating forward upon reading the image from the original, the junction of the third path and the first path as well as the junction of the fourth path and the first path being positioned at the upstream side of the platen roller with respect to an original transport direction in the first path, and the original transported in the first path being sent into the third path after the switchback movement by the platen roller.

21. A facsimile apparatus as claimed in claim 20 wherein the third transport means has a reversible transport roller, the transport roller in the reverse rotation transporting the original to a predetermined position in the third path after the switchback movement by the platen roller, and the transport roller in the forward rotation sending into the fourth path the original transported to the predetermined position in the third path.

22. A facsimile apparatus as claimed in claim 19 further comprising:
guiding means for receiving the original turned upside down and sent into the first path by the fourth transport means to guide into the first path.

23. A facsimile apparatus as claimed in claim 22 wherein the first transport means has a reversible change-over roller, the change-over roller in the reverse rotation selectively sending the original into the first path or to the guiding means.

24. In an image processing apparatus comprising a reading portion for reading an image from an original and a recording portion for forming an image on a recording paper, a method comprising the steps of:
reading the image on a first surface of the original while the original is transported in an original transport channel;
sending the original into a recording paper transport channel after the image on the first surface of the original is read;
sending the original through the recording paper transport channel into the original transport channel after the image on the first surface of the original is read while turning the original upside down;
reading the image on a second surface of the original turned upside down and transported in the original transport channel.

* * * * *

UNITED STATES PATENT AND TRADEMARK OFFICE
CERTIFICATE OF CORRECTION

PATENT NO. : 5,055,946

DATED : October 8, 1991

INVENTOR(S) : Yoshiyuki Kurahashi, et al.

It is certified that error appears in the above-identified patent and that said Letters Patent is hereby corrected as shown below:

In col. 1, line 8, change "surface" to --surfaces--.

In col. 5, line 66, change "conencting" to --connecting--.

In col. 9, line 56, change "1" to --$\ell$--.

In col. 11, line 42, change "roller" to --rollers--.

Signed and Sealed this

Second Day of March, 1993

Attest:

STEPHEN G. KUNIN

*Attesting Officer*     Acting Commissioner of Patents and Trademarks